(12) United States Patent
Jarnagin et al.

(10) Patent No.: US 10,745,587 B1
(45) Date of Patent: Aug. 18, 2020

(54) WATER-REPELLANT WAX COMPOSITIONS AND APPLICATIONS THEREOF

(71) Applicant: PSG-Functional Materials LLC, Rome, GA (US)

(72) Inventors: Nathan Jarnagin, Rome, GA (US); Michael S Williams, Rome, GA (US); Josh Land, Rome, GA (US); Jansuz Kowalik, Rome, GA (US)

(73) Assignee: PSG-Functional Materials LLC, Rome, GA (US)

( * ) Notice: Subject to any disclaimer, the term of this patent is extended or adjusted under 35 U.S.C. 154(b) by 0 days.

(21) Appl. No.: 15/940,940

(22) Filed: Mar. 29, 2018

Related U.S. Application Data

(60) Provisional application No. 62/478,585, filed on Mar. 29, 2017.

(51) Int. Cl.
| | |
|---|---|
| *C09D 191/00* | (2006.01) |
| *C09D 191/06* | (2006.01) |
| *E04F 15/04* | (2006.01) |
| *E04F 15/10* | (2006.01) |
| *B32B 21/04* | (2006.01) |
| *G01N 25/48* | (2006.01) |

(52) U.S. Cl.
CPC ............ *C09D 191/06* (2013.01); *B32B 21/04* (2013.01); *E04F 15/04* (2013.01); *E04F 15/105* (2013.01); *B32B 2307/712* (2013.01); *B32B 2391/00* (2013.01); *G01N 25/4893* (2013.01)

(58) Field of Classification Search
None
See application file for complete search history.

(56) References Cited

U.S. PATENT DOCUMENTS

| | | | | |
|---|---|---|---|---|
| 3,923,715 A | * | 12/1975 | Dettre | C08K 5/10 524/199 |
| 4,029,585 A | * | 6/1977 | Dettre | D06M 13/213 106/18.23 |
| 4,046,951 A | | 9/1977 | Stefanik | |
| 4,597,817 A | | 7/1986 | Larsen | |
| 4,897,291 A | * | 1/1990 | Kim | C08L 9/06 427/393 |

(Continued)

FOREIGN PATENT DOCUMENTS

| | | |
|---|---|---|
| DE | 4134452 | 4/1993 |
| DE | 19651149 | 6/1998 |

(Continued)

OTHER PUBLICATIONS

Wax Emulsions & Specialty Additives, BYK Additives & Instruments, Product Guide B-G Nov. 4, 2013, 6 pages.

*Primary Examiner* — Stefanie J Cohen
(74) *Attorney, Agent, or Firm* — Kilpatrick Townsend & Stockton LLP

(57) ABSTRACT

Compositions and methods for treating a cellulosic substrate to impart water resistance are disclosed herein. The compositions are waxy solids that include a mixture of a fluorowax and a hydrocarbon wax. The compositions are applied to cut edges of a cellulosic substrate, such as a wood-based flooring material, to impart water resistance to the cellulosic substrate. The compositions and methods are useful on a wide range of wood-based flooring materials, including hardwood, laminate, and engineered wood flooring.

20 Claims, 4 Drawing Sheets

(56) References Cited

U.S. PATENT DOCUMENTS

| | | | |
|---|---|---|---|
| 5,131,674 A * | 7/1992 | Tokui | C09G 3/00 280/600 |
| 5,356,716 A | 10/1994 | Patel et al. | |
| 5,608,122 A * | 3/1997 | Buchold | C07C 29/149 568/885 |
| 6,608,131 B1 | 8/2003 | Lewis et al. | |
| 2002/0023702 A1 | 2/2002 | Kettler et al. | |
| 2002/0164271 A1 * | 11/2002 | Ho | B82Y 15/00 422/82.08 |
| 2002/0194807 A1 | 12/2002 | Nelson et al. | |
| 2003/0019174 A1 * | 1/2003 | Bolduc | E04F 15/04 52/290 |
| 2003/0026954 A1 | 2/2003 | Winterowd et al. | |
| 2004/0146733 A1 * | 7/2004 | Fritschi | B27K 3/34 428/537.1 |
| 2006/0100340 A1 * | 5/2006 | Gao | C09D 15/00 524/475 |
| 2008/0041003 A1 | 2/2008 | Nowak et al. | |
| 2012/0121810 A1 * | 5/2012 | Grigsby, Jr. | C08G 18/3275 427/369 |

FOREIGN PATENT DOCUMENTS

| | | |
|---|---|---|
| EP | 1468805 | 10/2004 |
| WO | 2003012224 | 2/2003 |
| WO | 2004016422 | 2/2004 |
| WO | 2008078181 | 7/2008 |

* cited by examiner

WATER-REPELLANT WAX COMPOSITIONS AND APPLICATIONS THEREOF

CROSS-REFERENCE TO RELATED APPLICATIONS

This application claims priority to U.S. Provisional Patent Application 62/478,585, filed Mar. 29, 2017, the contents of which is herein incorporated by reference in its entirety.

FIELD

Disclosed herein are compositions and methods for imparting water repellency to a substrate. For example, the compositions and methods disclosed herein can impart water repellency to cellulosic substrates, such as wood products used as flooring materials.

BACKGROUND

The flooring industry has developed easy-to-install wood-based flooring that is cut in such a way that it easily snaps and locks together. This flooring may be made from hardwood, laminate, or engineered wood products, such as medium density fiberboard and oriented strand board. A drawback of this type of flooring is that cutting the edges to enable the boards to snap together leaves exposed wood or wood chips/fiber that easily can absorb water, which can cause irreversible swelling around joints of neighboring boards. Thus, edge sealants generally are applied prior to assembling the flooring, often by the manufacture when the edges are cut.

A variety of sealant materials have been used in attempts to render the cut edges of flooring more water resistant. Some such materials include acrylics, silicone-based materials, polyurethanes, styrene-butadiene copolymers, polytetrafluoroethylenes, latexes, emulsified waxes, and paraffin-based materials. Some sealing materials provide flexible coatings, while others provide more rigid protective coatings, for example coatings that cure and harden when exposed to UV radiation.

Despite the availability of certain options for imparting water resistance to flooring, there remains a need for improved products and methods for imparting water resistance to edges of wood-based flooring and other wood products that are easy to apply.

SUMMARY

The present disclosure provides compositions and methods for imparting water resistance, noise reduction, and lubricity to substrates, and in particular to the edges of cellulosic substrates, such as the edges of panels of wood-based flooring and other wood products, including but not limited to trim, furniture, subflooring, wall coverings, and the like. The compositions include fluorowaxes and non-fluorinated waxes (e.g. hydrocarbon waxes) that are solids at room temperature, but that can be melted by heating to facilitate application to the substrates.

According to some embodiments, a composition for treating a cellulosic substrate includes a fluorowax and a non-fluorinated wax. Optionally, the fluorowax comprises a fluorinated fatty acid ester. In some examples, the fluorinated fatty acid ester comprises a compound of Formula I

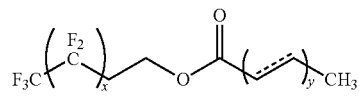

wherein ═══ is a single bond or a double bond, x is 3-13, and y is 4-10. Optionally, x is 5-7 and y is 8. In some examples, the fluorinated fatty acid ester comprises a compound of Formula II

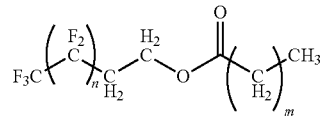

wherein n is 3-13 and m is 8-20. Optionally, n is 5-7 and m is 16. In various embodiments, the fluorowax has a melting point from 35° C. to 85° C. For example, the fluorowax may have a melting point from 40° C. to 55° C. In some embodiments, the non-fluorinated wax is a hydrocarbon wax, e.g., a paraffin wax, montan wax, beeswax, carnuba wax, or a synthetic wax. Optionally, the hydrocarbon wax is a paraffin wax. Optionally, the non-fluorinated wax has a melting point from 35° C. to 65° C. In some embodiments, the melting point of the composition is from 35° C. to 65° C. Optionally, the fluorowax is present in an amount from 1% to 99% by weight and the hydrocarbon wax is present in an amount from 99% to 1% by weight. Optionally, the composition comprises a weight ratio of fluorowax to non-fluorinated wax of 1:3 to 1:1.

According to further embodiments, a method of treating a cellulosic substrate includes heating a composition disclosed herein until the composition is a liquid; and applying the composition to the cellulosic substrate, wherein the composition is a liquid when it contacts the cellulosic substrate. Optionally, applying comprises spraying, wiping, brushing, or vacuum curtain coating.

According to various embodiments, a flooring material includes a cellulosic substrate and a fluorowax. In some examples, the fluorowax comprises a compound of Formula II

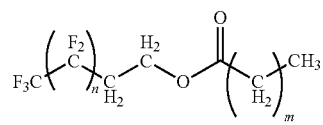

wherein n is 3-13 and m is 8-20. Optionally, n is 5-7 and m is 16. In some examples, the cellulosic substrate is hardwood, laminate wood flooring, or engineered wood flooring.

This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The accompanying drawings are included to provide a further understanding of the disclosure and are incorporated

DETAILED DESCRIPTION

Figure 1A:
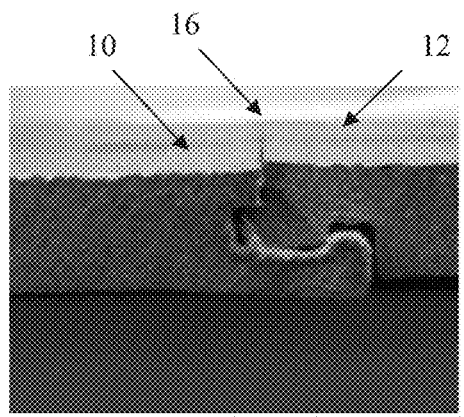
FIGS. 1A-1D illustrate steps of an edge swell test used to evaluate compositions according to embodiments disclosed herein.

Compositions and methods for treating a substrate to impart water resistance are disclosed herein. In some examples, the compositions and methods can impart water resistance to any cellulosic substrate, such as wood-based flooring, subflooring, trim, furniture, wall coverings, and the like. The compositions and methods are useful on a wide range of cellulosic substrates, including but not limited to wood-based flooring materials, such as hardwood flooring, wood-based laminate flooring, engineered wood flooring, and other wood-based flooring materials.

The compositions disclosed herein are wax blends that can be melted and applied to a cellulosic substrate, for example to edges of wood-based flooring. The wax blend compositions are hydrophobic and act as a barrier to prevent water from entering the edges of the wood-based flooring either during storage, transit, or installation or after installation. The wax blend compositions also provide lubricity to the edges of the wood-based flooring, which can facilitate installation, particularly where the flooring is designed with complimentary geometries that are profiled to be interlocking with edges of adjacent boards. The wax blend compositions further provide sound dampening, such as reduced squeaking, by reducing friction between adjacent floor boards.

Fluorowaxes:

The wax blend compositions disclosed herein include one or more of certain fluorowaxes, optionally mixed with one or more non-fluorinated waxes. Fluorowaxes according to embodiments described herein are solid at room temperature (i.e., about 23° C.) and can be fully melted at a temperature at or below about 160° C. In some embodiments, the fluorowaxes have molecular weights from about 400 to about 1000, and include a hydrocarbon chain as well as a perfluorinated carbon chain. In some examples, a fluorowax according to embodiments disclosed herein includes fluorine in an amount from about 30% by weight to about 60% by weight (e.g., from about 38 to about 45% by weight). In some examples, a fluorowax according to embodiments disclosed herein includes fluorine and carbon in a ratio from about 1:0.9 to about 1:3 (e.g., from about 1:1.17 to about 1:2).

In some embodiments, the fluorowaxes are fluorinated fatty acid esters. For example, in some embodiments, the compositions disclosed herein include esters of perfluoroalkyl-ethyl alcohols and fatty acids or compounds having equivalent structures. The perfluoroalkyl ethyl alcohol may be a C-4 to C-14 perfluoroalkyl-ethyl alcohol. In various examples, the perfluoroalkyl ethyl alcohol is a C-4 to C-6 perfluoroalkyl-ethyl alcohol. The fatty acid may be a C-10 to C-18 fatty acid and may be saturated or unsaturated. In various examples, the fatty acid is saturated. In some embodiments the fatty acid is a C-16 to C-18 fatty acid. In some embodiments, a useful fluorowax includes 2-(perfluoroalkyl)ethyl stearate (e.g., 2-(perfluorobutyl)ethyl stearate or 2-(perfluorohexyl)ethyl stearate). It should be understood that while the fluorowaxes may be described as having a structure that would be formed from certain alcohols and fatty acids, the actual method of synthesizing any particular fluorowax is not intended to be limiting on the present disclosure.

In some embodiments, useful fluorowaxes include those having the structure shown in Formula I.

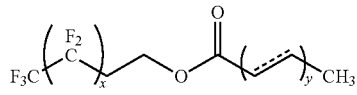

Formula I wherein x and y indicate numbers of repeat units, each ══════ independently is a single bond or a double bond, x is 3-13, and y is 4-10. In some examples 0 to 3 of the ══════ are double bonds and the rest are single bonds. In some examples, a compound of Formula I includes zero or one double bond. In some examples a compound of Formula I includes no double bonds. In some examples, x is 5-7. In a specific example x is 5. In some examples y is 8. In a further example x is 5-7 and y is 8.

In some embodiments, the hydrocarbon portion of the fluorinated fatty acid ester is saturated. Thus, in some embodiments, useful fluorowaxes include those having the structure shown in Formula II.

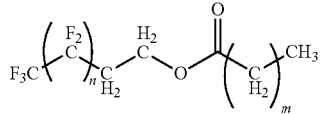

Formula II wherein n and m indicate numbers of repeat units, n is 3-13, and m is 8-20. In some examples, n is 5-7. In a specific example n is 5. In some examples m is 16. In a further example n is 5-7 and m is 16.

In some embodiments, a fluorowax described herein can be synthesized by reacting a fatty acid methyl ester with a fluoroalcohol. For example, a fluorowax of Formula II where n=5 and m=18 may be synthesized by the reaction shown in Scheme I.

Scheme I

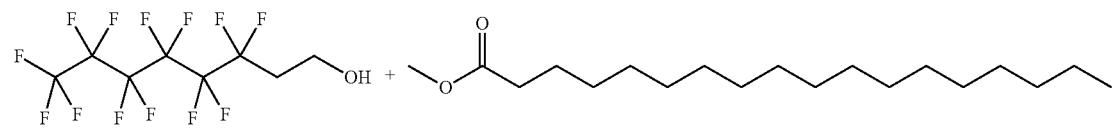

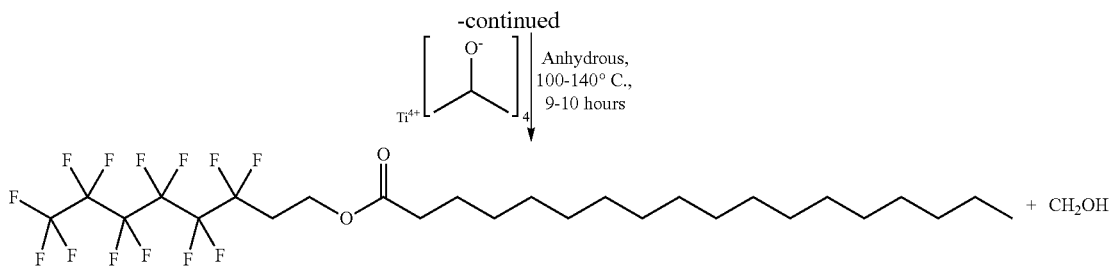

One of skill in the art will appreciate that other fluorowaxes described herein may be prepared by similar reactions. Moreover, compounds described herein can be prepared in a variety of ways known to one skilled in the art or by variations thereon as appreciated by those skilled in the art. The compounds described herein can be prepared from readily available starting materials. Optimum reaction conditions may vary with the particular reactants or solvents used, but such conditions can be determined by one skilled in the art.

A fluorowax disclosed herein can have melting points from about 35° C. to about 160° C. (e.g., from about 35° C. to about 85° C., or from about 40° C. to about 55° C.). The fluorowax may have a single melting point or may have multiple melting points. For example, the fluorowax may have a single melting point if it is prepared by a controlled synthetic method, such as but not limited to the reaction of fluorinated alcohol and fatty acid ester described above, such that each molecule of the wax has the same structure and size. Alternatively, the fluorowax may have multiple melting points, for example if it is a blend of fluorowaxes or if it is formed by a method that allows for the presence of wax molecules having different structures or sizes (e.g., chain length). Moreover, the melting point of a wax may be a distinct point or a range of a few degrees. While the wax should be a solid at room temperature, the upper limit of the melting point is only limited by the flashpoint of the particular wax and practical processing considerations, such as cost and safety associated with the need to heat the fluorowax or a wax blend including the fluorowax to a very high temperature to melt the wax or the wax blend for application to a cellulosic substrate.

Non-Fluorinated Waxes:

Optionally, a composition described here includes one or more fluorowaxes combined with one or more hydr non-fluorinated ocarbon waxes. The non-fluorinated waxes described herein are hydrocarbon waxes. As one example, a combination of non-fluorinated wax and fluorowax may be used when a certain fluorowax has certain desirable properties (e.g., water proofing properties) but has other undesirable properties (e.g., a melting point that makes treating a substrate with the fluorowax alone inefficient, or not cost effective). The wax compositions described herein have properties tailored to allow the waxes to be efficiently and effectively applied to a substrate and to provide beneficial properties (e.g., water resistance, lubricity, and noise dampening) to the substrate.

The non-fluorinated wax may be a natural wax, such as paraffin wax, montan wax, beeswax, or carnauba wax. The non-fluorinated wax alternatively may be a synthetic or semi-synthetic wax. In some embodiments, the non-fluorinated wax is a hydrocarbon wax, such as a paraffin wax, for example a paraffin wax sold commercially as Gulf Wax, Avatar® (e.g., Avatar AP130), or Parvan® (e.g., Parvan 1270). In some embodiments, the hydrocarbon wax may be a soft paraffin wax, such as petroleum jelly. In various examples, the non-fluorinated wax may be an amide wax, a polyethylene wax, a polypropylene wax, a Fischer-Tropsch wax, an ethylene vinyl acetate wax, or an ethylene acrylic acid wax.

In some embodiments, the hydrocarbon wax includes hydrocarbon chains of about 20 to about 50 carbons (e.g., 25 to 40). The hydrocarbon chains may be saturated or unsaturated, but typically include few if any unsaturations. In some embodiments, the hydrocarbon wax is saturated. In some embodiments, a hydrocarbon wax useful in a composition disclosed herein has one or more melting points from about 35° C. to about 160° C. (e.g., from about 35° C. to about 85° C., from about 35° C. to about 65° C., from about 35° C. to about 55° C., about 36° C., about 40° C., about 53° C., or about 55° C.). A person skilled in the art understands that some waxes, such as some paraffin waxes, have one melting point that can be considered a primary melting point, i.e., the point at which a majority of the composition melts, and have one or more other melting points where smaller quantities of lower molecular weight residues melt. Unless stated otherwise, melting points of paraffin waxes identified herein are the primary melting points.

Wax Blend Compositions:

A wax-blend composition disclosed herein includes one or more fluorowaxes optionally combined with one or more non-fluorinated waxes, for example with one or more hydrocarbon waxes. Thus, in some embodiments, the fluorowax may be present in an amount from 1% to 100% by weight (e.g., 1% to 90%, 10%-50%, 15% to 30%, or any weight percentage within those ranges), and the non-fluorinated may be present in an amount from 0% to 99% by weight (e.g., 10% to 99%, 50% to 90%, or 70% to 85%).

The compositions disclosed herein are waxy solids at room temperature, and have one or more melting points from 35° C. to 160° C. (e.g., from about 35° C. to about 85° C., from about 35° C. to about 65° C., from about 35° C. to about 55° C.). One skilled in the art will understand that a combination of waxes may exhibit a melting point or points that are unique from the melting point or points of the constituent waxes, and the melting point or points of the wax blend is not a simple average of the melting points of the constituent waxes.

A composition according to embodiments disclosed herein melts without decomposing. Thus, the composition can be melted by heating for applying to a substrate, but resolidifies upon return to room temperature. The composition is completely melted to a homogeneous liquid for application to a substrate, and the composition remains a liquid until at least until it contacts the substrate. The substrate is not heated, so upon or shortly after contacting the substrate, the composition will solidify.

While a precise melting point or melting points are not required, the melting point(s) of the wax blend are important and can impact the effectiveness and efficiency of the application. Further, preferred melting point(s) may vary depending on application method. In general, the melting point(s) of the wax blend should be sufficiently above room temperature such that the composition remains solid after it is applied to the substrate. If the melting point of a composition is too low, the composition will be an oil at normal ambient temperatures rather than a wax. Such oils will immediately penetrate an engineered wood product and potentially soften or degrade the resin binder and/or the resin-cellulosic interface. Such degradation could enhance rather than impede water penetration into the wood product and cellulosic fibers.

If the melting point is too high, however, application can be difficult to control as the composition may solidify on the application equipment (e.g. tubes or nozzles) before it can be applied to the substrate. The composition must be a liquid for application to a substrate, thus the composition is heated to a temperature above its melting point prior to application. The temperature to which the composition is heated must exceed that melting point by an amount sufficient to maintain the heated composition as a liquid despite any cooling during the application method prior to the composition contacting the substrate.

In some embodiments, the melting point of the wax blend can be adjusted by selection of the constituent waxes and their amounts. For example, the melting point could be lowered to mitigate any clumping or solidification issues associated with application during production. Furthermore, the melting point affects the infiltration of the wax into the exposed edge. Without wishing to be bound by theory, a lower melting point of the wax blend may tend to facilitate infiltration of the wax blend into the exposed edge. This can facilitate a more uniform coating and helps avoid excessive build-up of material on the surface he edges to lock appropriately. The melting point of the wax blend can be adjusted by utilizing waxes with different melting point in appropriate amounts.

The wax compositions disclosed herein have a water-like viscosity when liquefied, which allows them to penetrate voids in cellulosic material, at least to some extent. By contrast, sealants that include high molecular weight polymers cannot penetrate cellulosic materials when melted as well as the fluorowaxes and fluorowax compositions disclosed herein. The compositions disclosed herein can infiltrate a cellulosic substrate and provide good coverage of the substrate while avoiding excess solid buildup on the edge of the substrate. When the substrate is a wood-based floorboard, excess solid buildup adversely affects how the board joins with an adjacent board. If too much sealant is applied to the connecting edges, adjacent boards will not lock. If too little is applied, there will be insufficient thickness for good protection. In some embodiments, a composition disclosed herein includes a weight ratio of fluorowax to non-fluorinated wax of 1:9 to 9:1 (e.g., 1:5 to 5:1, 1:4 to 4:1, 1:3 to 3:1, 3:1 to 1:1).

In some examples, the compositions may further include a hydrophobic polymer. For example, in some embodiments, the compositions may include polyethylene, polypropylene, polystyrene or polyvinyl chloride. The polymer must be miscible with the wax compositions and must not adversely affect the melting point. Without wishing to be bound by theory, it is believed that incorporating a hydrophobic polymer may improve film formation. In some embodiments the compositions may include acids or amides, which might be useful to bind to cellulose and/or to urea formaldehyde resins in a substrate. Compositions may also include minerals, including but not limited to calcium carbonate, talc, kaolinite, and silica. A person skilled in the art could determine other suitable minerals. Minerals not only provide functionality for filler but provide barrier properties against water.

In some examples, the compositions disclosed herein are formulated without a solvent. In other examples, the compositions may be formulated as a solution. For example, the compositions may be formulated using a solvent, such as mineral spirits, toluene, hexane, cyclohexane, to enable coating methods such as spray coating, wiping, brushing, and curtain coating at room temperature. Mineral spirits, toluene, hexane, and cyclohexane all have boiling points from 100° C. to 300° C. After application the solvent evaporates leaving the wax composition on (and in some embodiments in) the cellulosic substrate. In some embodiments, heat may be used to speed evaporation of the solvent.

In some embodiments, the compositions disclosed herein are formulated as emulsions. In some examples, the emulsions are formed in water and may include one or more surfactants. One skilled in the art could determine a suitable surfactant (or combination of surfactants) depending on the composition of the wax-blend. Examples of useful surfactants include polysorbate 80 (commercially available as TWEEN® 80) and sorbitan monooleate (commercially available as SPAN® 80), but other surfactants also could be used. In various examples, one or more non-ionic, anionic, and/or cationic surfactants could be used.

When applied to a cellulosic substrate, such as wood-based flooring or other wood product (e.g., hardwood, plywood, etc.), the wax blend compositions described herein can impart water-resistance and also can dampen sound. In some embodiments, the compositions are intended for treating the edges of wood-based flooring. In some examples, the compositions are used to treat freshly cut edges, including edges that are profiled to be interlocking with edges of adjacent boards. While the compositions are applied to the edges of the wood, the compositions may also penetrate into the wood substrate, at least to some extent. The compositions are hydrophobic and act a barrier to water, filling pores or voids in the edge of the cellulosic substrate.

The wax blend compositions disclosed herein may be used to impart water resistance to a variety of cellulosic materials, such as wood-based flooring, subflooring, trim, furniture, wall coverings, and the like. Wood-based flooring and other wood products treated with these wax blend compositions resist absorption of water at cut edges, such as the joint between adjacent floor boards, and resist swelling that results from water absorption. Wood based flooring treated with the wax blend compositions disclosed herein also may exhibit reduced noise, such as reduced squeaking, due to a reduction of friction between neighboring boards. The compositions and methods disclosed herein are useful on a wide range of wood-based flooring, including hardwood, laminate, and engineered wood flooring. Laminate and engineered wood flooring may include, for example, wood consisting at least partially of low density fiberboard (LDF), medium density fiberboard (MDF), high density fiberboard (HDF), particle board, or oriented strand board (OSB). The resin adhesives in these engineered wood composites may include, for example, urea formaldehyde (UF), modified UF (mUF), or paramethylene diisocyanate (pMDI).

The compositions described herein may be applied to flooring and wood products according to known methods, such as but not limited to spray, wiping or brushing, vacuum curtain coating. The compositions described herein are heated for application to the flooring so that the composition is liquid at the time of application and then solidifies after being applied. In some embodiments, the compositions are heated to within a range of 85° C. to 150° C. (e.g., 100° C. to 120° C.) for application to a substrate. If the composition is not heated to a temperature sufficiently higher than the melting point, the composition may solidify during the application method on application equipment prior to contacting the substrate. Such solidification prevents effective application on the substrate and also can clog application equipment, such as tubes and nozzles, which typically are not heated. Thus, for application to a substrate, a composition must be heated to a temperature sufficiently above its melting point that the composition remains a liquid until it is actually applied to the substrate. For example, when a composition is applied by curtain coating only the reservoir containing the wax composition is heated, but the liquefied wax should remain liquid while it traverses unheated application equipment, including tubes and nozzles, and ideally any wax that does not coat the substrate should be recovered while still liquid and returned to the reservoir for subsequent use. The heating temperature will vary based on the exact composition and the method of application, but could be determined by one skilled in the art.

While the compositions and methods herein are described with regard to treating wood flooring, other wood-based materials may also benefit from treatment with the same compositions.

EXAMPLES

Throughout these examples two fluorowaxes according to embodiments disclosed herein were tested alone or in combination with various hydrocarbon waxes. The fluorowaxes used in the following examples were compounds of Formula II, where n=5 and m=16 and compounds of Formula II, where n=7 and m=16. The compounds where n=5 are referred to herein as C6 fluorowaxes, due to the 6 fluorinated carbons, and the compounds where n=7 are referred to herein as C8 fluorowaxes, due to the 8 fluorinated carbons.

Example 1: Synthesis of a Fluorowax According to Embodiments Described Herein

A clean, dry reactor fitted with a condenser was heated to 60° C. Methyl stearate (7000 mL) was added with vacuum to the reactor. 1H,1H,2H,2H-perfluoro-1-octanol (4400 mL) was added with vacuum to the reactor. A nitrogen purge was added at 2 standard cubic feet per hour, and the reactor was closed and heated to 80° C. with stirring at 150 rpm. Once 80° C. was reached, titanium isopropoxide was added with vacuum. Methanol began distilling through the condenser. The reaction mixture was heated to 140° C. After 8 hours, reaction progress was determined by measuring the amount of residual methyl stearate via gas chromatography/mass spectroscopy (GC/MS) to determine if reaction was complete. The reaction was not complete at 8 hours and was allowed to continue for 2 more hours, when the reaction was determined to be complete by GC/MS. One skilled in the art will understand that reaction time and temperature may need to be adjusted if the reaction is scaled up or down. Once the reaction was complete, the reaction mixture was placed under vacuum to distill off any remaining alcohol. The reaction produced methanol (640 g), which was continuously removed by distillation. The isopropoxide was not remove at this time. The reaction produced 2-(perfluorobutyl)ethyl stearate (12600 g) as a waxy, white solid. Further information regarding the reactants and products is provided in Table 1.

TABLE 1

| Physical Data | | | | |
|---|---|---|---|---|
| Reactants | Density (g/cm$^3$) | Melting Point (C.) | Notes | CAS |
| Methyl Stearate | 0.85 | 37 | Density at 40° C. | 112-61-8 |
| 1H, 1H, 2H, 2H-perfluoro-l-octanol | 1.651 | NA | | 647-42-7 |
| Titanium Isopropoxide | 0.96 | 14 | | 546-68-9 |
| Methanol Distillate | 0.792 | −97.6 | Expected distillate | 67-56-1 |

| Experimental Data | | | | | |
|---|---|---|---|---|---|
| Reactants | Molecular Wt (g/mol) | Equivalents | mol | Mass (g) | Volume (mL) |
| Methyl Stearate | 298.5 | 1 | 20 | 6000 | 7000 |
| 1H, 1H, 2H, 2H-perfluoro-l-octanol | 364.1 | 1 | 20 | 7300 | 4400 |
| Titanium Isopropoxide | 284.22 | 0.01 | 0.2 | 56.8 | 59 |
| Methanol Distillate | 32 | 20 | 640 | | |
| Formula II, n = 5, m = 16 | 631 | 20 | 12600 | | |

Temp (° C.): 140
Time (hr): 10

Example 2: General Procedure for Formulating Treating Compositions without Solvent Compositions according to embodiments described herein were formulated as waxy solids. The compositions were formed by combining 2-(perfluorobutyl)ethyl stearate (i.e., a composition of Formula II, where n=5 and m=16) or 2-(perfluorohexyl)ethyl stearate (i.e. a composition of Formula II, where n=7 and m=16) with a paraffin wax having a primary melting point at 53° C. and a secondary melting point at 35° C. (commercially available as PARVAN® 1270). The paraffin wax and the fluorowax were heated at 80° C. for 24 hours. The paraffin wax and fluorowax were then combined in a drum and mixed for 10 minutes (if mixing speed is too high the mixture will foam). The paraffin wax/fluorowax mixture was then heated at 80° C. for 12 hours, after which the combined material was decanted into a new drum until a brown material (impurity) begins to come out of the drum. The decanted paraffin wax/fluorowax mixture was a clear liquid. The remaining brown liquid includes the titanium isopropoxide catalyst from synthesizing the fluorowax. Several compositions made by this general method are described in the Table 2.

TABLE 2

| Formulation | Fluorowax (wt. %) | Parvan ® Paraffin (wt. %) | Soft paraffin (e.g. Vaseline petroleum jelly) (wt. %) |
|---|---|---|---|
| 1 | 0% | 100% | 0% |
| 2 | 0% | 0% | 100% |
| 3 | C8 – 50% | 50% | 0% |
| 4 | C8 – 100% | 0% | 0% |
| 5 | C6 – 12.5% | 87.5% | 0% |
| 6 | C6 – 25% | 75% | 0% |
| 7 | C6 – 25% | 56.25% | 18.75% |
| 8 | C6 – 25% | 37.5% | 37.5% |
| 9 | C6 – 50% | 50% | 0% |
| 10 | C6 – 100% | 0% | 0% |

Example 3: Effect of Adding Paraffin to a Fluorowax

Edge Swell Test (C8 Fluorowax):

Compositions of Formulations 1, 3, and 4 (C8 fluorowax with increasing percentages of fluorowax wax) were applied to the edges of 8-in MDF laminate board flooring using a foam brush applicator. Prior to application, the composition was heated, such that the wax was liquid when applied to the boards. The boards were wiped to saturated the edges.

Figure 1B:
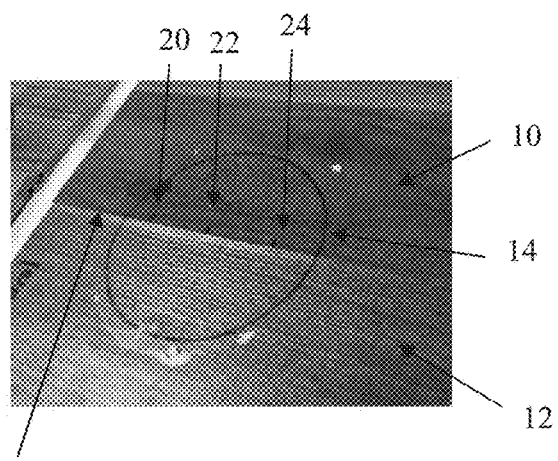
Figure 1C:
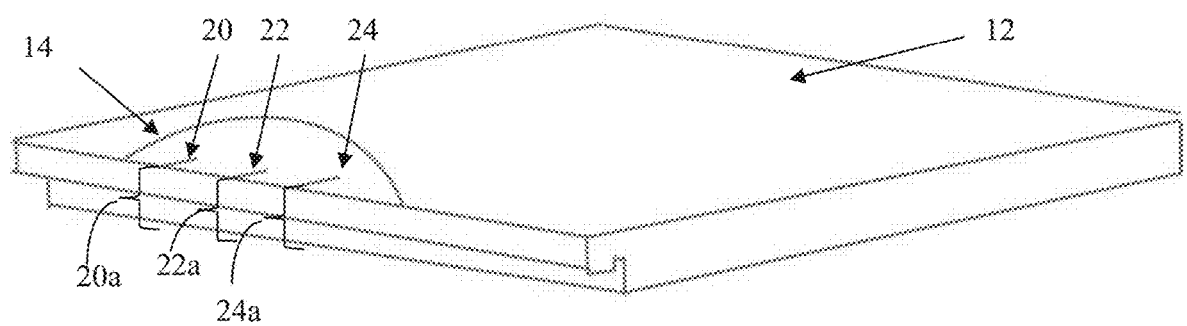
Figure 1D:
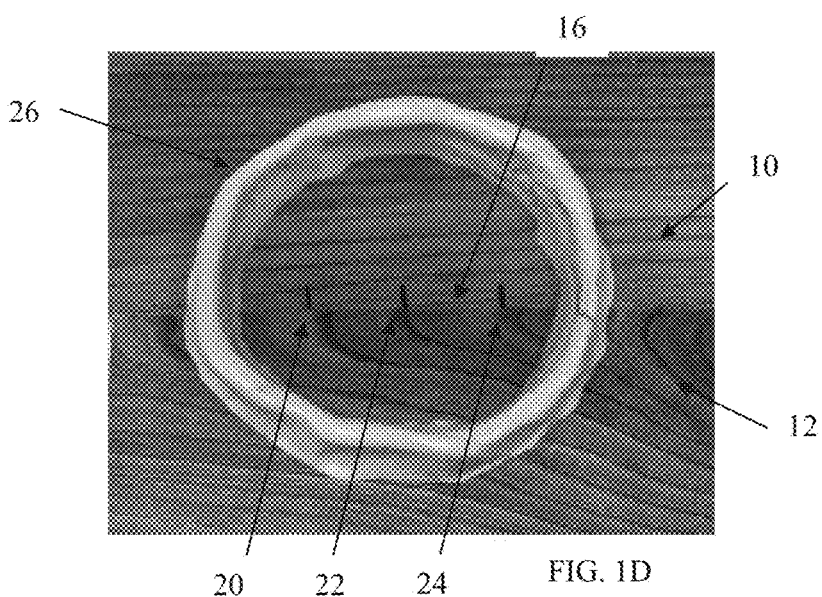

The treated boards were evaluated for water resistance using an edge swell test. Untreated boards and boards treated with Lanaseal 37 were used for comparison. The edge swell test was set up as shown in FIGS. 1A-1D. Two adjoining boards 10, 12 were assembled as shown in FIG. 1A-1B. A ring 14 about three inches in diameter was marked on the adjoining boards 10,12 with the joint 16 between the two adjoining boards 10, 12 approximately through the center of the ring 14. Three evenly spaced marks 20, 22, 24 were drawn in the ring 14 across the joint 16 between the adjoining boards 10, 12. The boards 10, 12 were disassembled and the thickness 20a, 22a, 24a at each mark 20, 22, 24 was measured for each board 10, 12 using a caliper. The boards 10, 12 were rejoined and plumbers putty was used to create a sealed wall 26 along the ring 24 around the marks 20, 22, 24, as shown in FIG. 1D.

About 20 milliliters of a red Kool-Aid solution was poured into the sealed wall 26 and allowed to sit undisturbed in a flat horizontal position until all of the solution had passed through the joint 16 or evaporated (approximately 24 hours).

After the red solution had soaked in or evaporated, the boards 10, 12 were separated and the thicknesses 20a, 22a, 24a at each mark 20, 22, 24 was measured again. The red solution provided a relative indicator of water ingress along the edge and a visual cue for edge swelling that was imperceptible by eye. Results are shown in Table 3.

Figure 2:
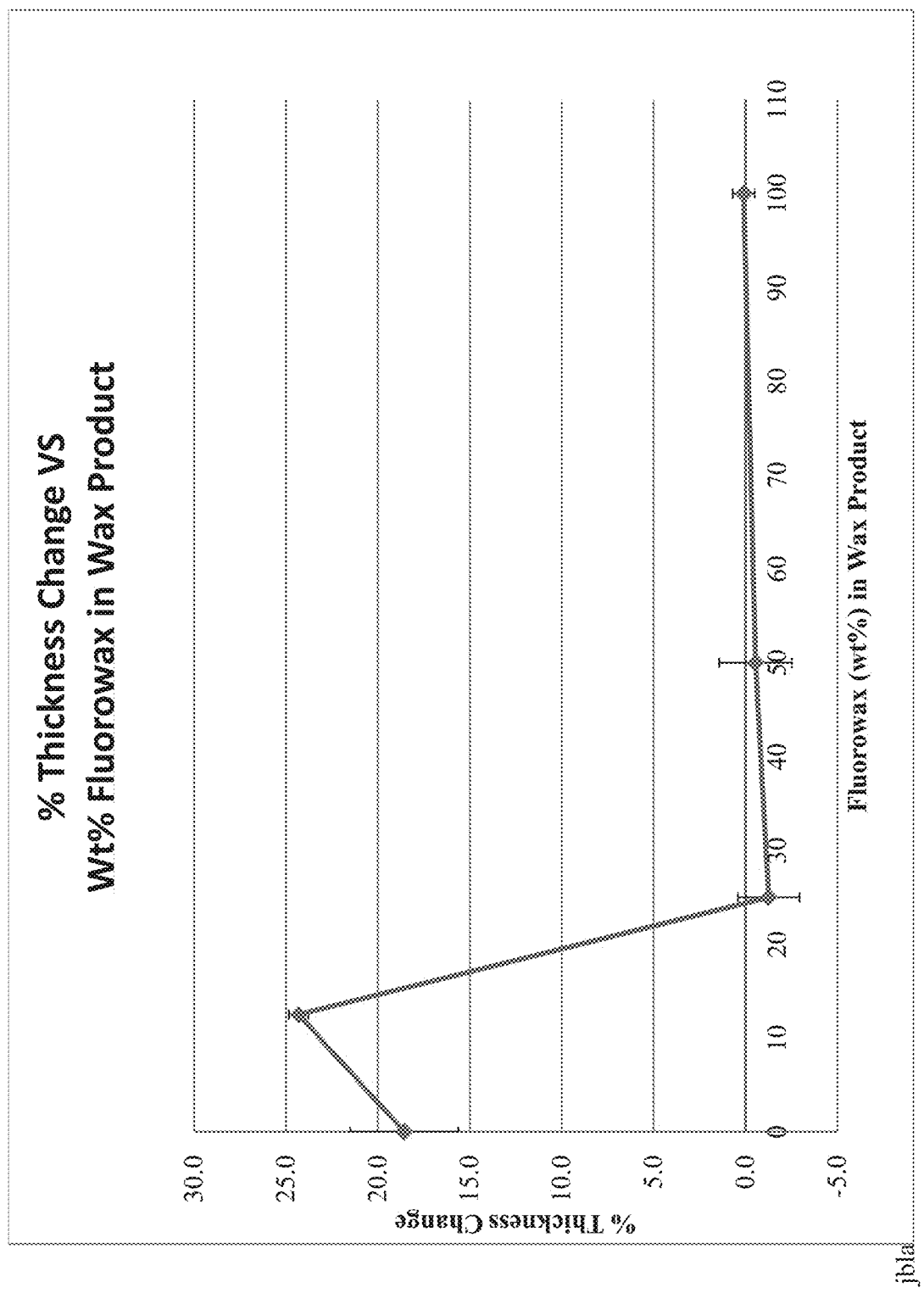
FIG. 2 is a chart showing chart showing results of an edge swell test for compositions according to embodiments disclosed herein.

Edge Swell Test (C6 Fluorowax):

The same treating and testing procedures were followed for Formulations 1, 5, 6, 9, and 10 (C6 fluorowaxes with increasing percentages of fluorowax). FIG. 2 is a chart showing % thickness change as a function of wt. % of fluorinated wax for those examples.

Contact Angle and Surface Energy (C8 Fluorowax):

Compositions of Formulations 1, 3, and 4 were applied to glass slide substrates resulting in thin films used for contact angle analysis. Prior to application, each composition was heated, such that the wax was liquid when applied. Contact angle analysis was conducted using a Kruss DSA 100 instrument. Contact angle analysis was performed using water (10 μL) and diiodomethane (4 μL). The amount was determined by the volume that allowed a droplet to release from a syringe by gravity. The falling distance between the syringe and the surface was minimized. The contact angle was determined using Young Laplace contact angle fit, optimized for asymmetric droplets. The surface free energy calculations were carried out by the Owens, Wendt, Rabel, and Kaelble (OWRK) method. Incorporation of the fluorowax increased the hydrophobilicy and oleophobicity of the wax material as indicated by the relative increase in the water contact angle and diiodomethane contact angle. This resulted in a substantial decrease in surface energy. Results are shown in Table 3.

TABLE 3

| Sample | Water Contact Angle (degrees) | Diiodomethane Contact Angle (degrees) | Surface Free Energy (mN/m) | Relative Thickness Change after 24 hours (%) |
|---|---|---|---|---|
| no coating | NA | NA | NA | 8.2 |
| Lanaseal 37 coat | NA | NA | NA | 16.3 |
| Formulation 1 | 111.0 (±0.3) | 67.9 (±1.1) | 18.17 | 2.7 |
| Formulation 3 | 123.8 (±1) | 86.3 (±1.6) | 6.51 | 1.3 |
| Formulation 5 | 127.6 (±1.2) | 77.1 (±1.5) | 5.59 | 0 |

Example 4: Effect of Replacing Higher Melting Paraffin with a Lower Melting Paraffin Compositions of Formulations 6, 7, and 8 (C6 fluorowax at 25% with increasing proportion of soft paraffin relative to paraffin), were applied to glass slide substrates resulting in thin films used for contact angle analysis. Prior to application, each composition was heated, such that the wax was liquid when applied. Contact angle analysis was conducted using a Kruss DSA 100 instrument. Contact angle analysis was performed using water (10 μL) and diiodomethane (4 μL). The amount was determined by the volume that allowed a droplet to release from a syringe by gravity. The falling distance between the syringe and the surface was minimized. The contact angle was determined using Young Laplace contact angle fit, optimized for asymmetric droplets. The surface free energy calculations were carried out by the Owens, Wendt, Rabel, and Kaelble (OWRK) method. Results are shown in Table 4.

Compositions of Formulations 2, 6, and 7 were applied to the edges of 8-in MDF laminate board flooring using a foam brush applicator. Prior to application, the composition was heated, such that the wax was liquid when applied. The boards were wiped to saturate the edges. The treated boards were evaluated for water resistance using the edge swell test discussed previously. The sealed boards were exposed to Kool-Aid solution for 24 hours, then any remaining solution on the surface of the boards was removed, and the boards where separated. The separated edges were examined by eye. Any board that exhibited obvious thickness change perceptible by eye was considered a "failed" result. A passing result did not have any perceptible thickness change by eye. Formulation 6 and 7, which contain soft paraffin exhibited smaller thickness change compared with Formulation 2, which included the higher melting point paraffin without any soft paraffin (Table 4). Here, lowering the melting point of the wax may facilitate higher infiltration of the wax into the exposed edge compared with the higher melting point waxes. It was observed that the material with a lower melting point generally formed a more uniform coating. It was also observed that the material with the higher melting point sometimes resulted in boards that would not lock properly due to material build up on the edge during coating.

TABLE 4

| Formulation | Contact Angle (degrees) Water | Contact Angle (degree) Diiodo-methane | Surface Free Energy (mN/m) | % Failure Observed on the Board Edge | Average % Thickness Change |
|---|---|---|---|---|---|
| 6 | 108 | 73 | 21.3 | 50 | 1.2 ± 1.3 |
| 7 | 110 | 64 | 18.3 | 0 | 0.1 ± 0.2 |
| 8 | 110 | 66 | 19.3 | 33 | 0.2 ± 0.5 |

Figure 3:
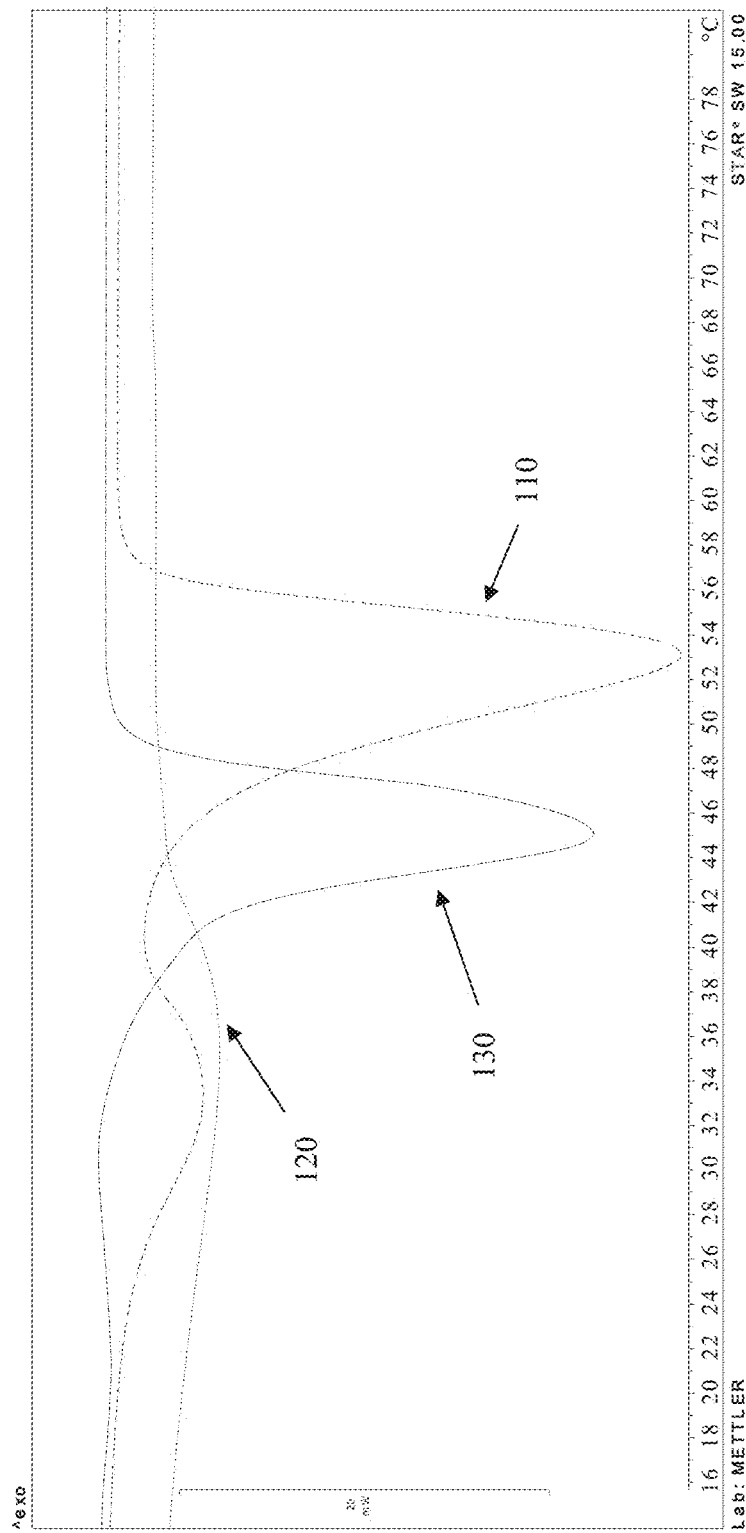
FIG. 3 shows differential scanning calorimetry curves for compositions according to embodiments disclosed herein.
Figure 4:
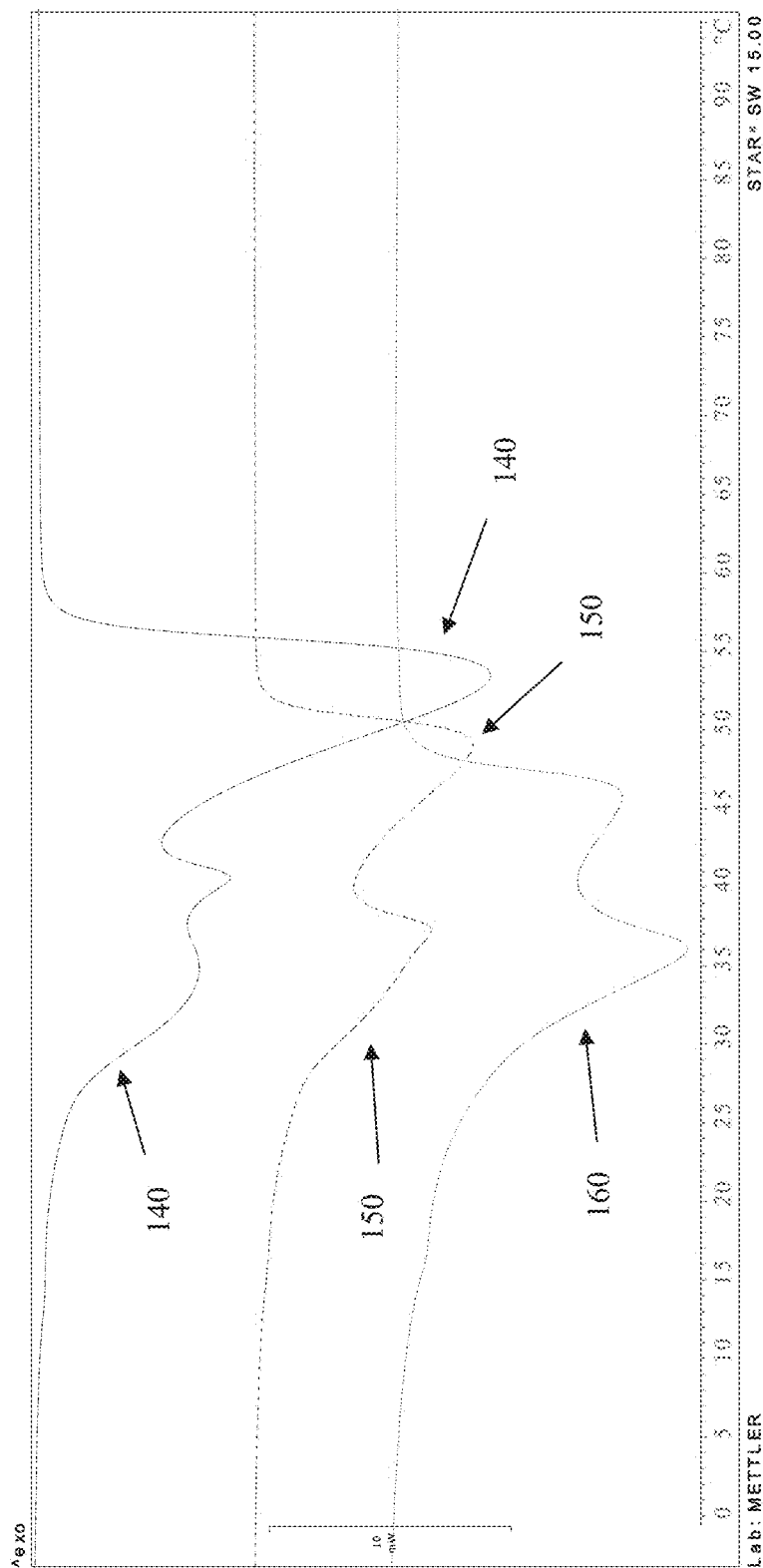
FIG. 4 shows differential scanning calorimetry curves for compositions according to embodiments disclosed herein.

* Failure is defined as visual observation of thickness change (i.e. swelling) of the edge Example 5: Melting Points of Wax Materials Melting point was evaluated using differential scanning calorimetry (DSC) using a Mettler Toledo DSC 3 Instrument. The experiment consisted of two thermal cycles consisting of a heating step (−25° C. to 125° C.) and a cooling step (125° C. to −25° C.) with heating rate of 20° C. per minute. Melting point was determined from the heating step of the second thermal cycle. Melting points were evaluated for treating compositions described herein and on individual waxes suitable for use in the treating compositions described herein. FIGS. 3-4 show DSC curves for individual waxes used in the examples. FIG. 3 shows DSC curves for Formulation 1, 100% Parvan paraffin (110); Formulation 2, 100% soft paraffin (120); and Formulation 10, 100% C6 fluorowax (130). These curves indicate melting points of 35° C. and 53° C. for Parvan paraffin, 36° C. for soft paraffin, and 45° C. for the C6 fluorowax. FIG. 4 shows DSC curves for Formulations 6 (140), 7 (150), and 8 (160) (C6 fluorowax at 25% with increasing proportion of soft paraffin relative to paraffin). These curves indicate melting points of about 35° C., about 42° C., and about 53° C. for Formulation 6, about 37° C. and about 49° C. for Formulation 7, and about 36° C. and 46° C. for Formulation 8.

Example 6: Forming an Aqueous Emulsion

An aqueous emulsion was formed by combining 135 g of the wax of Formulation 6 with 17.7 g of Tween 80 and 16.10 g of Span 80 and mixing at about 60° C. to form a substantially homogenous solution. The mixture was maintained at 60° C. while water (506 mL) was added dropwise forming an emulsion. The emulsion was cooled slowly, and filtered using filter paper with 200 μm pore size. Particle size was measured by dynamic light scattering and was 99% 250 nm (standard deviation=110 nm) and 1% 5200 nm (standard deviation=480 nm).

The compositions and methods described herein and recited in the appended claims are not limited in scope by the specific compositions and methods exemplified herein, which are intended as illustrations of a few aspects of the claims and any compositions. Compounds and methods that are functionally equivalent are within the scope of this disclosure. The synthetic routes described herein illustrate general methods of synthesizing compounds of Formula (I) or Formula (II), and the skilled artisan will appreciate that the compounds described herein could be made by methods other than those specifically described herein, by adaptation of the methods described herein and/or by adaptation of methods known in the art. All quantities shown are approximate, and are given solely for illustrative purposes.

That which is claimed is:

1. A treated substrate comprising a wax blend and a cellulosic substrate, wherein the wax blend comprises a fluorowax and a non-fluorinated wax, wherein the fluorowax comprises a fluorinated fatty acid ester, wherein the fluorinated fatty acid ester comprises a compound of Formula I

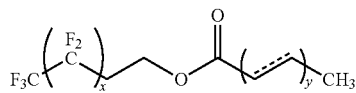

wherein ====== is a single bond or a double bond, x is 3-13, and y is 4-10, and wherein the wax blend penetrates into a surface of the cellulosic substrate.

2. The treated substrate of claim 1, wherein x is 5-7 and y is 8.

3. The treated substrate of claim 1, wherein the fluorinated fatty acid ester comprises a compound of Formula II

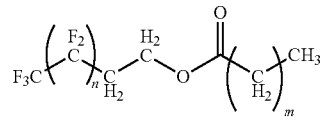

wherein n is 3-13 and m is 8-20.

4. The treated substrate of claim 3, wherein n is 5-7 and m is 16.

5. The treated substrate of claim 1, wherein the fluorowax has a melting point from 35° C. to 85° C.

6. The treated substrate of claim 1, wherein the fluorowax has a melting point from 40° C. to 55° C.

7. The treated substrate of claim 1, wherein the non-fluorinated wax is a paraffin wax, montan wax, beeswax, carnauba wax, or a synthetic wax.

8. The treated substrate of claim 1, wherein the non-fluorinated wax is a hydrocarbon wax.

9. The treated substrate of claim 1, wherein the non-fluorinated wax has a melting point from 35° C. to 65° C.

10. The treated substrate of claim 1, wherein the melting point of the wax blend is from 35° C. to 65° C.

11. The treated substrate of claim 1, wherein the fluorowax present in the wax blend in an amount from 1% to 99% by weight and the non-fluorinated wax is present in the wax blend in an amount from 99% to 1% by weight.

12. The treated substrate of claim 1, wherein the wax blend comprises a weight ratio of fluorowax to non-fluorinated wax of 1:3 to 1:1.

13. The treated substrate of claim 8, wherein the hydrocarbon wax is a paraffin wax.

14. The treated substrate of claim 1, wherein the wax blend further comprises a hydrophobic polymer.

15. The treated substrate of claim 14, wherein the hydrophobic polymer comprises polyethylene, polypropylene, polystyrene, or polyvinyl chloride.

16. The treated substrate of claim 1, wherein the wax blend further comprises a mineral selected from calcium carbonate, talc, kaolinite, and silica.

17. The treated substrate of claim 1, wherein the cellulosic substrate comprises a cut edge and wherein the cut edge comprises the surface penetrated by the wax blend.

18. The treated substrate of claim 1, wherein the cellulosic substrate comprises a wood-based flooring material.

19. The treated substrate of claim 18, wherein the wood-based flooring material comprises hardwood flooring, laminate flooring, or engineered wood flooring.

20. The treated substrate of claim 18, wherein the wood-based flooring material comprises low density fiberboard, medium density fiberboard, high density fiberboard, particle board, or oriented strand board.

\* \* \* \* \*